US006730227B2

(12) United States Patent
Zeiher et al.

(10) Patent No.: US 6,730,227 B2
(45) Date of Patent: May 4, 2004

(54) METHOD OF MONITORING MEMBRANE SEPARATION PROCESSES

(75) Inventors: E. H. Kelle Zeiher, Naperville, IL (US); Bosco P. Ho, Wheaton, IL (US); John E. Hoots, St. Charles, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 10/109,260

(22) Filed: Mar. 28, 2002

(65) Prior Publication Data

US 2003/0183575 A1 Oct. 2, 2003

(51) Int. Cl.[7] ................................................. B01D 61/22
(52) U.S. Cl. ........................ 210/650; 210/94; 210/143; 210/321.69; 210/636; 210/695; 210/745; 422/82.08; 436/172
(58) Field of Search ............................... 422/82.07, 14, 422/62, 82.05, 82.08, 82.09; 210/94, 143, 650, 651, 652, 321.69, 636, 639, 686, 709, 745, 96.2, 321.6; 436/55, 56, 164, 172

(56) References Cited

U.S. PATENT DOCUMENTS

| | | | |
|---|---|---|---|
| 4,783,314 A | 11/1988 | Hoots et al. ................. 210/745 |
| 4,992,380 A | 2/1991 | Moriarty et al. ............ 436/164 |
| 5,171,450 A | * 12/1992 | Hoots ......................... 210/745 |
| 5,260,386 A | * 11/1993 | Fong et al. |
| 5,320,967 A | 6/1994 | Avallone et al. ............ 436/172 |
| 5,416,323 A | 5/1995 | Hoots et al. |
| 5,435,969 A | * 7/1995 | Hoots et al. ................. 436/172 |
| 5,714,387 A | 2/1998 | Fowee et al. ................ 436/172 |
| 6,113,797 A | * 9/2000 | Al-Samadi ................... 210/652 |
| 6,312,644 B1 | * 11/2001 | Moriarty et al. .............. 422/14 |
| 6,329,165 B1 | 12/2001 | Chattoraj et al. |
| 6,645,428 B1 | * 11/2003 | Morris et al. ................. 422/15 |

FOREIGN PATENT DOCUMENTS

JP    10-282410    4/2000

OTHER PUBLICATIONS

Osmonics, The Filtration Spectrum, Copyright 1998 by Osmonics, Inc. Minnetonka, Minnesota, USA.
Corporate Headquarters, 5951 Clearwater Drive, Minnetonka, Minnesota 55343–8995 USA.

* cited by examiner

*Primary Examiner*—Joseph Drodge
(74) *Attorney, Agent, or Firm*—Margaret M. Brumm; Thomas M. Breininger

(57) ABSTRACT

Methods and systems for monitoring and/or controlling membrane separation systems or processes are provided. The present invention utilizes measurable amounts of inert fluorescent tracers and tagged fluorescent agents added to a feed stream to evaluate and/or control one or more parameters specific to membrane separation such that performance thereof can be optimized. The methods and systems of the present invention can be utilized in a variety of different industrial applications including raw water processing and waste water processing.

29 Claims, No Drawings

METHOD OF MONITORING MEMBRANE SEPARATION PROCESSES

FIELD OF THE INVENTION

This invention relates generally to membrane separation and, more particularly, to methods for monitoring and/or controlling membrane separation processes.

BACKGROUND OF THE INVENTION

Membrane separation, which uses a selective membrane, is a fairly recent addition to the industrial separation technology for processing of liquid streams, such as water purification. In membrane separation, constituents of the influent typically pass through the membrane as a result of a driving force(s) in one effluent stream, thus leaving behind some portion of the original constituents in a second stream. Membrane separations commonly used for water purification or other liquid processing include microfiltration (MF), ultrafiltration (UF), nanofiltration (NF), reverse osmosis (RO), electrodialysis, electrodeionization, pervaporation, membrane extraction, membrane distillation, membrane stripping, membrane aeration, and other processes. The driving force of the separation depends on the type of the membrane separation. Pressure-driven membrane filtration, also known as membrane filtration, includes microfiltration, ultrafiltration, nanofiltration and reverse osmosis, and uses pressure as a driving force, whereas the electrical driving force is used in electrodialysis and electrodeionization. Historically, membrane separation processes or systems were not considered cost effective for water treatment due to the adverse impacts that membrane scaling, membrane fouling, membrane degradation and the like had on the efficiency of removing solutes from aqueous water streams. However, advancements in technology have now made membrane separation a more commercially viable technology for treating aqueous feed streams suitable for use in industrial processes.

Further, membrane separation processes have also been made more practical for industrial use, particularly for raw and wastewater purification. This has been achieved through the use of improved diagnostic tools or techniques for evaluating membrane separation performance. The performance of membrane separation, such as efficiency (e.g. flux or membrane permeability) and effectiveness (e.g. rejection or selectivity), are typically affected by various parameters concerning the operating conditions of the process. Therefore, it is desirable to monitor these and other types of process parameters specific to membrane separation to assess the performance of the process and/or the operating conditions. In this regard, a variety of different diagnostic techniques for monitoring membrane separation processes have been routinely used and are now understood and accepted as essential to its practicality and viability for industrial use.

However, monitoring is typically conducted on an intermittent basis, for example, once a work shift or at times less frequently. Known employed monitoring techniques can also be labor and time intensive. Thus, adjustments made to membrane separation processes in order to enhance performance based on typical monitoring may not be made in an expeditious manner. In addition, the presently available monitoring techniques often do not provide optimal sensitivity and selectivity with respect to monitoring a variety of process parameters that are generally relied on as indicators to evaluate and/or control membrane separation processes.

For example, monitoring techniques typically applied to reverse osmosis and nanofiltration include conductivity measurements and flow measurements. Conductivity measurements are inherently less accurate in order to determine the recovery of solutes which are substantially retained by the membrane. In this regard, conductive salts, typically used as an indicator during conductive measurements, can pass through the membrane. Since salts generally pass through the membrane as a percentage of the total salt concentration, changes in local concentration due to concentration gradients or the like can change the conductivity of the product water without necessarily indicating membrane damage. This is especially true in the last stage of a multi-stage cross flow membrane system where salt concentrations (and, therefore, passage of salts as a percentage of that concentration) reach their highest levels. In this regard, the salt passage/percent rejection parameter is generally determined as an average value based on values measured during all stages of the membrane system.

Further, flow meters generally employed in such systems are subject to calibration inaccuracies, thus requiring frequent calibration. Moreover, typical monitoring of reverse osmosis and other membrane separations can routinely require the additional and/or combined use of a number of different techniques, thus increasing the complexity and expense of monitoring.

Accordingly, a need exists to monitor and/or control membrane separation processes which can treat feed streams, such as aqueous feed streams, suitable for use in industrial processes where conventional monitoring techniques are generally complex and/or may lack the sensitivity and selectivity necessary to adequately monitor one or more process parameters specific to membrane separation processes which are important to the evaluation of the performance of membrane separation.

SUMMARY OF THE INVENTION

The present invention provides methods and systems for monitoring and/or controlling membrane separation processes capable of treating feed streams suitable for use in industrial processes. In this regard, the detection of inert fluorescent tracers and tagged fluorescent agents is utilized to evaluate and/or control a number of different process parameters unique to membrane separation, such as operational parameters, chemical parameters, a ratio of the inert fluorescent tracer to the tagged fluorescent agent, mechanical parameters and combinations thereof.

The inert fluorescent tracer/tagged fluorescent agent monitoring technique of the present invention can be performed with a high degree of sensitivity and selectivity with respect to the monitoring of process parameters specific to a membrane separation. In this regard, the methods and systems of the present invention can be effectively utilized to optimize the performance of membrane separation processes. Examples of such optimized performance include longer times between membrane cleanings, longer membrane life, verification of treatment chemical in the system, tracking of chemical consumption, ability to operate at optimal recovery, and decreased energy costs due to better control of scaling, fouling and other system parameters.

To this end, in an embodiment of the present invention, a method for monitoring a membrane separation process including a membrane capable of separating a feed stream into a first stream and a second stream to remove solutes from the feed stream is provided. The method includes the steps of providing an inert fluorescent tracer and a tagged fluorescent agent; introducing the inert fluorescent tracer and tagged fluorescent agent into the feed stream; providing a fluorometer to detect the fluorescent signal of the inert fluorescent tracer and the tagged fluorescent agent in at least one of the feed stream, the first stream and the second stream; and using the fluorometer to determine an amount of the inert fluorescent tracer and the tagged fluorescent agent in at least one of the feed stream, the first stream and the second stream.

In another embodiment, a method for monitoring a membrane separation system of a water purification process including a membrane capable of removing solutes from a feed stream suitable for use in an industrial process is provided. The method includes the steps of adding an inert fluorescent tracer and a tagged fluorescent agent to the feed stream; contacting the membrane with the feed stream; separating the feed stream into a permeate stream and a concentrate stream to remove solutes from the feed stream; providing a fluorometer to detect the fluorescent signal of the inert fluorescent tracer and the tagged fluorescent agent in at least one of the feed stream, the permeate stream and the concentrate stream; using the fluorometer to measure an amount of the inert fluorescent tracer and the tagged fluorescent agent in at least one of the feed stream, the permeate stream and the concentrate stream; and determining a ratio of the inert fluorescent tracer to the tagged fluorescent agent based on the measurable amounts of the inert fluorescent tracer and the tagged fluorescent agent.

In yet another embodiment, a membrane separation system capable of purifying a feed stream suitable for use in an industrial process is provided. The membrane separation system includes a semi-permeable membrane capable of separating the feed stream containing an inert fluorescent tracer and a tagged fluorescent agent into a permeate stream and a concentrate stream to remove one or more solutes from the feed stream; a detection device capable of fluorometrically measuring an amount of the inert fluorescent tracer and the tagged fluorescent agent each ranging from about 5 parts per trillion ("ppt") to about 1000 parts per million ("ppm") in at least one of the feed stream, the permeate stream and the concentrate stream wherein the detection device is capable of producing a signal indicative of the amount of inert fluorescent tracer and tagged fluorescent agent that is measured; and a controller capable of processing the signal to monitor and/or control the purification of the feed stream. Such monitoring or control may include control of chemical dosing and checking the accuracy/calibration of standard instruments (e.g. flow sensors).

In still another embodiment, a method for monitoring and controlling a membrane separation process including a membrane capable of removing solutes from a feed stream for use in an industrial process is provided. The method includes the steps of adding an inert fluorescent tracer and a tagged fluorescent agent to the feed stream; contacting the membrane with the feed stream; separating the feed stream into a first effluent stream and a second effluent stream to remove solutes from the feed stream; providing a fluorometer to detect the fluorescent signal of the inert fluorescent tracer and the tagged fluorescent agent in at least one of the feed stream, the first effluent stream and the second effluent stream; using the fluorometer to measure the inert fluorescent tracer and the tagged fluorescent agent in an amount ranging from about 5 ppt to about 1000 ppm in at least one of the feed stream, the first effluent stream and the second effluent stream; and evaluating at least one process parameter specific to membrane separation based on the measurable amounts of the inert fluorescent tracer and the tagged fluorescent agent.

It is, therefore, an advantage of the present invention to provide methods and systems that utilize inert fluorescent tracers in combination with tagged fluorescent agents to monitor and/or control membrane separation processes or systems.

Another advantage of the present invention is to provide methods and systems that utilize measurable amounts of inert fluorescent tracers and tagged fluorescent agents to improve the operational efficiency of membrane separation processes or systems.

A further advantage of the present invention is to provide methods and systems for monitoring parameters specific to membrane separation processes with selectivity, specificity and accuracy based on measurable amounts of inert fluorescent tracers and tagged fluorescent agents added to the membrane separation system.

Yet another advantage of the present invention is to provide methods and systems for monitoring and/or controlling membrane separation processes for purifying aqueous feed streams suitable for use in industrial water systems.

Still further an advantage of the present invention is to enhance performance of membrane separation processes or systems that utilize cross-flow and/or dead-end flow separation to remove solutes from feed streams.

Additional features and advantages of the present invention are described in, and will be apparent in, the detailed description of the presently preferred embodiments.

DETAILED DESCRIPTION OF THE PRESENTLY PREFERRED EMBODIMENTS

The present invention provides methods and systems for monitoring and/or controlling membrane separation processes that are capable of removing solutes from feed streams, such as aqueous feed streams, which are suitable for use in a number of different industrial applications. More specifically, the methods and systems of the present invention can monitor and/or control membrane separation processes based on measurable amounts of inert fluorescent tracers and tagged fluorescent agents which have been added to the membrane separation process. In this regard, a number of different process parameters specific to membrane separation including, for example, operational parameters, chemical parameters, mechanical parameters, like parameters and combinations thereof, can be evaluated with a high degree of selectivity, specificity and accuracy such that the performance of the membrane separation process can be effectively optimized.

Applicants have surprisingly discovered that the monitoring of an inert fluorescent tracer in combination with a tagged fluorescent agent can be effectively utilized to monitor and/or control a variety of different parameters specific to membrane separation, particularly with respect to monitoring and/or controlling the effects of treatment agents on the scaling and/or fouling during membrane separation.

With inert fluorescent tracer monitoring, it is assumed that the inert molecule of the fluorescent tracer and the treatment molecule of the treatment agent can be both concentrated and/or rejected or otherwise passed through a given membrane separation system at the same rate. In other words, the inert fluorescent molecule is assumed to behave in substantially the same manner as the treatment molecule.

However, treatment agents can be adsorbed on the surface of growing crystals or otherwise associated with the crystals and/or the membrane or other surfaces present in the system. In this regard, a portion of the treatment agent initially added to the membrane separation system can be effectively taken out of solution, thus rendering that portion of the treatment agent useless or "spent."

When the treatment agent is modified so that it contains a fluorescent moiety (fluorophore) as part of its chemical structure, it is said to be "tagged" and then functions as the tagged fluorescent agent.

The tagged fluorescent agent used in combination with the inert fluorescent tracer can be effectively utilized to monitor the effect of the treatment agent in the membrane separation process. The tagged fluorescent agent and the inert fluorescent tracer must have similar rejection characteristics with respect to the type of membrane used for optimal monitoring performance. On one level, monitoring of the inert fluorescent tracer can be utilized to monitor the dosage of the treatment agent added to membrane separation. Further, the tagged fluorescent agent can be utilized to monitor the active chemical ingredient of the treatment. The active chemical ingredient of the treatment is that part of the chemical treatment which adsorbs onto the surface of growing crystals as discussed above.

In this regard, the treatment agent (or molecule thereof) is tagged or incorporated with a fluorescent tag or group such that effects on the treatment due to, for example, adsorption of the treatment agent on a growing crystal, can be evaluated. Thus, loss of treatment can be detected by evaluating changes in the ratio of inert fluorescent tracer to tagged fluorescent agent as measured. Applicants have uniquely discovered that such a system can indicate consumption of the active treatment agent and can be used to controllably and responsively increase and/or decrease the amount of treatment agent(s) or product(s) added to membrane separation depending on actual conditions rather than assumptions based on the sole monitoring of inert fluorescent tracers.

The methods and systems of the present invention can include a variety of different and suitable components, process steps, operating conditions and the like, for monitoring and/or controlling membrane separation processes or systems. In an embodiment, the membrane separation process of the present invention includes cross flow and dead-end flow processes. During cross-flow processes, the feed stream can be treated in a flow direction that is substantially parallel to the membrane of the separation system. With respect to dead-end flow separation processes, the feed stream can be treated in a flow direction that is substantially perpendicular to the membrane of the separation system.

In general, the membrane separation processes of the present invention are capable of treating or purifying aqueous feed streams by dividing the feed stream into separate streams. In an embodiment, the feed stream is separated into at least a first and second stream, such as a permeate stream and a concentrate stream. The feed stream can contain various solutes, such as dissolved organics, dissolved inorganics, dissolved solids, suspended solids, the like or combinations thereof. Upon separation of the feed stream into the permeate and the concentrate, in membrane filters for example, the permeate stream essentially contains a substantially lower concentration of dissolved and/or suspended solutes as compared to the aqueous feed stream. On the other hand, the concentrate stream has a higher concentration of dissolved and/or suspended solutes as compared to the aqueous stream. In this regard, the permeate represents a purified feed stream, such as a purified aqueous feed stream.

It should be appreciated that the present invention can be utilized with respect to a number of different types of membrane separation processes including, for example, cross-flow processes, dead-end flow processes, reverse osmosis, ultrafiltration, microfiltration, nanofiltration, electrodialysis, electrodeionization, pervaporation, membrane extraction, membrane distillation, membrane stripping, membrane aeration and the like or combinations thereof. Reverse osmosis, ultrafiltration, microfiltration and nanofiltration are the preferred membrane separation processes.

In reverse osmosis, the feed stream is typically processed under cross-flow conditions. In this regard, the feed stream flows substantially parallel to the membrane surface such that only a portion of the feed stream diffuses through the membrane as permeate. The cross-flow rate is routinely high in order to provide a scouring action that lessens membrane surface fouling. This can also decrease concentration polarization effects (e.g., concentration of solutes in the reduced-turbulence boundary layer at the membrane surface which can increase the osmotic pressure at the membrane and thus reduces permeate flow). The concentration polarization effects can inhibit the feed stream water from passing through the membrane as permeate, thus decreasing the recovery ratio, e.g., the ratio of permeate to applied feed stream. A recycle loop(s) may be employed to maintain a high flow rate across the membrane surface.

Reverse osmosis processes can employ a variety of different types of membranes. Such commercial membrane element types include, without limitation, hollow fiber membrane elements, tubular membrane elements, spiral-wound membrane elements, plate and frame membrane elements, and the like, some of which are described in more detail in "The Nalco Water Handbook," Second Edition, Frank N. Kemmer ed., McGraw-Hill Book Company, New York, N.Y., 1988, incorporated hereinto, particularly Chapter 15 entitled "Membrane Separation". It should be appreciated that a single membrane element may be used in a given membrane filtration system, but a number of membrane elements can also be used depending on the industrial application.

A typical reverse osmosis system is described as an example of membrane filtration and more generally membrane separation. Reverse osmosis uses mainly spiral wound elements or modules, which are constructed by winding layers of semi-porous membranes with feed spacers and permeate water carriers around a central perforated permeate collection tube. Typically the modules are sealed with tape and/or fiberglass over-wrap. The resulting construction has one channel which can receive an inlet flow. The inlet stream flows longitudinally along the membrane module and exits the other end as a concentrate stream. Within the module, water passes through the semi-porous membrane and is trapped in a permeate channel which flows to a central collection tube. From this tube it flows out of a designated channel and is collected.

In practice, membrane modules are stacked together, end to end, with inter-connectors joining the permeate tubes of the first module to the permeate tube of the second module, and so on. These membrane module stacks are housed in pressure vessels. Within the pressure vessel feed water passes into the first module in the stack, which removes a portion of the water as permeate water. The concentrate stream from the first membrane becomes the feed stream of the second membrane and so on down the stack. The permeate streams from all of the membranes in the stack are collected in the joined permeate tubes. Only the feed stream entering the first module, the combined permeate stream and the final concentrate stream from the last module in the stack are commonly monitored.

Within most reverse osmosis systems, pressure vessels are arranged in either "stages" or "passes." In a staged membrane system, the combined concentrate streams from a bank of pressure vessels are directed to a second bank of pressure vessels where they become the feed stream for the second stage. Commonly systems have 2 to 3 stages with successively fewer pressure vessels in each stage. For example, a system may contain 4 pressure vessels in a first stage, the concentrate streams of which feed 2 pressure vessels in a second stage, the concentrate streams of which in turn feed 1 pressure vessel in the third stage. This is designated as a "4:2:1" array. In a staged membrane configuration, the combined permeate streams from all pressure vessels in all stages are collected and used without further membrane treatment. Multi-stage systems are used when large volumes of purified water are required, for example for boiler feed water. The permeate streams from the membrane system may be further purified by ion exchange or other means.

In a multi-pass system, the permeate streams from each bank of pressure vessels are collected and used as the feed to the subsequent banks of pressure vessels. The concentrate streams from all pressure vessels are combined without further membrane treatment of each individual stream. Multi-pass systems are used when very high purity water is required, for example in the microelectronics or pharmaceutical industries.

It should be clear from the above examples that the concentrate stream of one stage of an RO system can be the feed stream of another stage. Likewise the permeate stream of a single pass of a multi-pass system may be the feed stream of a subsequent pass. A challenge in monitoring systems such as the reverse osmosis examples cited above is that there are a limited number of places where sampling and monitoring can occur, namely the feed, permeate and concentrate streams. In some, but not all, systems "inter-stage" sampling points allow sampling/monitoring of the first stage concentrate/second stage feed stream. Similar inter-pass sample points may be available on multi-pass systems as well.

In practice it is possible to "probe" the permeate collection tube within a single pressure vessel to sample the quality of the permeate from each of the membrane elements in the stack. It is a time consuming, messy and inexact method and is not routinely applied except in troubleshooting situations. There is no currently accepted method of examining the feed/concentrate stream quality of individual membrane elements within a single pressure vessel.

In contrast to cross-flow filtration membrane separation processes, conventional filtration of suspended solids can be conducted by passing a feed fluid through a filter media or membrane in a substantially perpendicular direction. This effectively creates one exit stream during the service cycle. Periodically, the filter is backwashed by passing a clean fluid in a direction opposite to the feed, generating a backwash effluent containing species that have been retained by the filter. Thus conventional filtration produces a feed stream, a purified stream and a backwash stream. This type of membrane separation is typically referred to as dead-end flow separation and is typically limited to the separation of suspended particles greater than about one micron in size.

Cross-flow filtration techniques, on the other hand, can be used for removing smaller particles (generally about one micron in size or less), colloids and dissolved solutes. Such types of cross-flow membrane separation systems can include, for example, reverse osmosis, microfiltration, ultrafiltration, nanofiltration, electrodialysis or the like. Reverse osmosis can remove even low molecular weight dissolved species that are at least about 0.0001 to about 0.001 microns in minimum diameter, including, for example, ionic and nonionic species, low molecular weight molecules, water-soluble macromolecules or polymers, suspended solids, colloids, and such substances as bacteria and viruses.

In this regard, reverse osmosis is often used commercially to treat water that has a moderate to high (e.g., 500 ppm or greater) total dissolved solids ("TDS") content. Typically on order of from about 2 percent to about 5 percent of the TDS of a feed stream will pass through the membrane. Thus, in general the permeate may not be entirely free of solutes. In this regard, the TDS of reverse osmosis permeates may be too high for some industrial applications, such as use as makeup water for high pressure boilers. Therefore, reverse osmosis systems and other like membrane separation systems are frequently used prior to and in combination with an ion exchange process or other suitable process to reduce the TDS loading on the resin and to decrease the amount of hazardous material used and stored for resin regeneration, such as acids and sodium hydroxide.

As discussed above, the performance of membrane separation systems can vary with respect to a number of different operational conditions specific to membrane separation, such as temperature, pH, pressure, permeate flow, activity of treatment and/or cleaning agents, fouling activity and the like. When developing and/or implementing a monitoring and/or control program based on the detection of fluorescent agents (e.g., inert fluorescent tracers and tagged fluorescent agents), the effects of the operational conditions specific to membrane separation must necessarily be taken into consideration. As previously discussed, the operational conditions of water treatment processes can vary greatly from process to process. In this regard, the monitoring techniques as applied to each process can also vary greatly.

Membrane separation processes and the monitoring thereof are unique because of the following considerations.

1. Systems are constructed with limited flexibility in terms of where monitoring may be done and/or where samples may be collected.

2. Membrane separation systems include a concentration polarization layer that forms as water is permeated through the barrier. This is not present in other water treatment systems, such as cooling water systems.

3. Membrane separation systems operate at significantly lower temperatures than industrial processes where inverse solubility of solutes is a problem. However, in the case of membrane separation systems such as reverse osmosis and nanofiltration, this low temperature leads to scaling from salts that are less likely to be problematic in higher temperature processes (such as silica and silicate salts). In this regard, typical day-to-day membrane separation operations (for example RO and NF) occur at about 75° F.

4. Because it is essential that the surface of the membrane remain clean, a relatively small amount of fine precipitate can cause a significant performance loss. The performance loss in a membrane is, thus, more sensitive to precipitate deposition as compared to cooling water treatment. In this regard, performance loss in a membrane can occur at a film thickness appreciably lower than that required for heat transfer loss to occur in a cooling water system.

5. Water loss in membrane filtration is due to "permeation" or passage through the membrane barrier. Damaged or otherwise imperfect membranes are susceptible to undesirable leakage of solutes through the membrane. Thus it is critical to monitor leakage through the membrane to keep it operating at maximum efficiency.

6. The thin, semi-permeable films (polymeric, organic or inorganic) are sensitive to degradation by chemical species. Products which contact the membranes surface must be compatible with the membrane chemistry to avoid damaging the surface and thereby degrading performance.

7. Chemical treatments used in membrane systems must be demonstrated to be compatible with the membrane material prior to use. Damage from incompatible chemicals can result in immediate loss of performance and perhaps degradation of the membrane surface. Such immediate, irreversible damage from a chemical treatment is highly uncommon in cooling water systems.

Based on these differences, a number of different factors and considerations must necessarily be taken into account when developing and/or implementing monitoring and/or controlling programs with respect to membrane separation systems as compared to other water treatment processes, such as cooling water treatment processes.

For example, both the cost of the membrane and the energy consumed can be significant operating cost factors specific to a membrane separation process. In this regard, deposits of scale and foulants on the membrane, on a small scale, can adversely impact the performance of membrane separation systems by, in membrane filtration for example, decreasing the permeate flow for a given driving force, lowering the permeate quality (purity), increasing energy consumed to maintain a given permeate flow, causing membrane replacement and/or unscheduled downtime for membrane replacement or cleaning/renovation, other like conditions and combinations thereof. In this regard, the continuous monitoring of process parameters specific to membrane separation, such as a ratio of inert fluorescent tracer to tagged fluorescent agent, the normalized permeate flow, driving force, and percent rejection, are generally believed to be critical to the detection of fouling and/or scaling and, thus, the implementation of remedial measures when such problems are observed. In reverse osmosis, about a ten to fifteen percent change in any of these parameters routinely signals a scaling/fouling problem requiring a responsive action, such as the adjustment of the dosage of treatment agent. Thus, detection of these problems at the earliest possible time can prevent, for example, undue energy consumption, loss of product, premature membrane replacement or the like. Ideally, when an unfavorable or questionable condition or change is detected in a system, some means, such as an alarm, will be used to notify an operator of the condition or change. Corrective action may then be taken as necessary or appropriate.

Applicants have uniquely discovered that the monitoring and/or controlling techniques of membrane separation processes in accordance with the present invention are faster, more sensitive, more comprehensive and/or more reliable than conventional techniques presently available, particularly where the monitoring methods of the present invention are employed on a substantially continuous basis. The present invention has enhanced diagnostic capabilities such that, for example, lack of chemical treatment, scaling and/or fouling problems unique to membrane separation and consumption of active chemical treatment can be detected with reasonable certainty, with far greater sensitivity, under a far less elapsed time than the presently available methods. In this regard, temporary system upsets or other short-lived variations can be detected during continuous monitoring as the transient conditions that they are, rather than as incorrect warning signs as detected by sporadic monitorings.

As previously discussed, the methods and systems of the present invention employ inert fluorescent tracers in combination with tagged fluorescent agents to monitor and/or control the membrane separation processes. By utilizing inert fluorescent tracers with tagged fluorescent agents, the present invention can evaluate a number of different membrane separation process parameters with a greater selectivity, sensitivity and accuracy as compared to conventional monitoring techniques. In this regard, the measurable amount of inert fluorescent tracers and tagged fluorescent agents can be effectively utilized to optimally maximize the performance of such systems.

For example, chemical consumption can be determined by comparing the concentrations of the inert fluorescent tracer to the tagged fluorescent agent. Ideally, the concentration ratio of the inert fluorescent tracer to the tagged fluorescent agent should be 1/1. As the tagged fluorescent agent is consumed (for example by adsorbing onto a crystal), the concentration ratio will begin to change. For instance, the concentration of the tagged fluorescent agent may drop, changing the ratio from 1/1 to 1/0.9 (which is to say the ratio of the concentrations is 1.1). As the concentration of the tagged fluorescent agent drops still further, for example down to 0.5 units of concentration, the ratio also changes. In this case, the ratio becomes 1/0.5 or 2. It should be appreciated that the ratio of concentrations is a unitless number. Thus, from this example it can be seen that an increase of the concentration ratio signifies consumption of the tagged fluorescent agent and as such is indicative of the onset of scaling and/or fouling in the membrane.

The term "inert," as used herein refers to an inert fluorescent tracer that is not appreciably or significantly affected by any other chemistry in the system, or by the other system parameters such as pH, temperature, ionic strength, redox potential, microbiological activity or biocide concentration. To quantify what is meant by "not appreciably or significantly affected", this statement means that an inert fluorescent compound has no more than a 10% change in its fluorescent signal, under severe conditions encountered in industrial water systems. Severe conditions normally encountered in industrial water systems are known to people of ordinary skill in the art of industrial water systems.

It should be appreciated that a variety of different and suitable inert fluorescent tracers can be utilized in any suitable amount, number and application. For example, a single tracer can be used to evaluate a number of different membrane separation process parameters. However, the present invention can include the use of a number of different tracers each functioning as tracers for separate monitoring applications. In an embodiment, inert fluorescent tracer monitoring of the present invention can be conducted on a singular, intermittent or semi-continuous basis, and preferably the concentration determination of the tracer in the stream is conducted on-site to provide a rapid real-time determination.

An inert fluorescent tracer must be transportable with the water of the membrane separation system and thus substantially, if not wholly, water-soluble therein at the concentration it is used, under the temperature and pressure conditions specific and unique to the membrane separation system. In other words, an inert fluorescent tracer displays properties similar to a solute of the membrane separation process in which it is used. In an embodiment, it is preferred that the inert fluorescent tracer of the present invention meet the following criteria:

1. Not be adsorbed by the membrane to any appreciable amount;

2. Not degrade the membrane or otherwise hinder its performance or alter its composition;
3. Be detectable on a continuous or semi-continuous basis and susceptible to concentration measurements that are accurate, repeatable and capable of being performed on feedwater, concentrate water, permeate water or other suitable media or combinations thereof;
4. Be substantially foreign to the chemical species that are normally present in the water of the membrane separation systems in which the inert fluorescent tracer(s) may be used;
5. Be substantially impervious to interference from, or biasing by, the chemical species that are normally present in the water of membrane separation systems in which the inert fluorescent tracer(s) may be used;
6. Be substantially impervious to any of its own potential specific or selective losses from the water of membrane separation systems, including selective permeation of the membrane;
7. Be compatible with all treatment agents employed in the water of the membrane separation systems in which the inert fluorescent tracer(s) may be used, and thus in no way reduce the efficacy thereof;
8. Be compatible with all components of its formulation; and
9. Be relatively nontoxic and environmentally safe, not only within the environs of the water or the membrane separation process in which it may be used, but also upon discharge therefrom.

A variety of different and suitable types of compounds can be utilized as inert fluorescent tracers. In an embodiment, the inert fluorescent compounds can include, for example, the following compounds:

3,6-acridinediamine, N,N,N',N'-tetramethyl-, monohydrochloride, also known as Acridine Orange (CAS Registry No. 65-61-2),
2-anthracenesulfonic acid sodium salt (CAS Registry No. 16106-40-4),
1,5-anthracenedisulfonic acid (CAS Registry No. 61736-91-2) and salts thereof,
2,6-anthracenedisulfonic acid (CAS Registry No. 61736-95-6) and salts thereof,
1,8-anthracenedisulfonic acid (CAS Registry No. 61736-92-3) and salts thereof,
anthra[9,1,2-cde]benzo[rst]pentaphene-5,10-diol, 16,17-dimethoxy-, bis(hydrogen sulfate), disodium salt, also known as Anthrasol Green IBA (CAS Registry No. 2538-84-3, aka Solubilized Vat Dye),
bathophenanthrolinedisulfonic acid disodium salt (CAS Registry No. 52746-49-3),
amino 2,5-benzene disulfonic acid (CAS Registry No. 41184-20-7),
2-(4-aminophenyl)-6-methylbenzothiazole (CAS Registry No. 92-36-4),
1H-benz[de]isoquinoline-5-sulfonic acid, 6-amino-2,3-dihydro-2-(4-methylphenyl)-1,3-dioxo-, monosodium salt, also known as Brilliant Acid Yellow 8G (CAS Registry No. 2391-30-2, aka Lissamine Yellow FF, Acid Yellow 7),
phenoxazin-5-ium, 1-(aminocarbonyl)-7-(diethylamino)-3,4-dihydroxy-, chloride, also known as Celestine Blue (CAS Registry No. 1562-90-9),
benzo[a]phenoxazin-7-ium, 5,9-diamino-, acetate, also known as cresyl violet acetate (CAS Registry No. 10510-54-0),
4-dibenzofuransulfonic acid (CAS Registry No. 42137-76-8),
3-dibenzofuransulfonic acid (CAS Registry No. 215189-98-3),
1-ethylquinaldinium iodide (CAS Registry No. 606-53-3),
fluorescein (CAS Registry No. 2321-07-5),
fluorescein, sodium salt (CAS Registry No. 518-47-8, aka Acid Yellow 73, Uranine),
Keyfluor White ST (CAS Registry No. 144470-48-4, aka Flu. Bright 28),
benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Keyfluor White CN (CAS Registry No. 16470-24-9),
C.I. Fluorescent Brightener 230, also known as Leucophor BSB (CAS Registry No. 68444-86-0),
benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-tetrasodium salt, also known as Leucophor BMB (CAS Registry No. 16470-24-9, aka Leucophor U, Flu. Bright. 290),
9,9'-biacridinium, 10,10'-dimethyl-, dinitrate, also known as Lucigenin (CAS Registry No. 2315-97-1, aka bis-N-methylacridinium nitrate),
1-deoxy-1-(3,4-dihydro-7,8-dimethyl-2,4-dioxobenzo[g]pteridin-10(2H)-yl)-D-ribitol, also known as Riboflavin or Vitamin B2 (CAS Registry No. 83-88-5),
mono-, di-, or tri-sulfonated napthalenes, including but not limited to
  1,5-naphthalenedisulfonic acid, disodium salt (hydrate) (CAS Registry No. 1655-29-4, aka 1,5-NDSA hydrate),
  2-amino-1-naphthalenesulfonic acid (CAS Registry No. 81-16-3),
  5-amino-2-naphthalenesulfonic acid (CAS Registry No. 119-79-9),
  4-amino-3-hydroxy-2-naphthalenesulfonic acid (CAS Registry No. 90-51-7),
  6-amino-4-hydroxy-2-naphthalenesulfonic acid (CAS Registry No. 116-63-2),
  7-amino-1,3-naphthalenesulfonic acid, potassium salt (CAS Registry No. 79873-35-1),
  4-amino-5-hydroxy-2,7-naphthalenedisulfonic acid (CAS Registry No. 90-20-0),
  5-dimethylamino-1-naphthalenesulfonic acid (CAS Registry No. 4272-77-9),
  1-amino-4-naphthalene sulfonic acid (CAS Registry No. 84-86-6),
  1-amino-7-naphthalene sulfonic acid (CAS Registry No. 119-28-8), and
  2,6-naphthalenedicarboxylic acid, dipotassium salt (CAS Registry No. 2666-06-0),
3,4,9,10-perylenetetracarboxylic acid (CAS Registry No. 81-32-3),
C.I. Fluorescent Brightener 191, also known as Phorwite CL (CAS Registry No. 1227-053-0),
C.I. Fluorescent Brightener 200, also known as Phorwite BKL (CAS Registry No. 61968-72-7),
benzenesulfonic acid, 2,2'-(1,2-ethenediyl)bis-(4-phenyl-2H-1,2,3-triazol-2-yl)-, dipotassium salt, also known as Phorwite BHC 766 (CAS Registry No. 52237-03-3),
benzenesulfonic acid, 5-(2H-naphtho[1,2-d]triazol-2-yl)-2-(2-phenylethenyl)-, sodium salt, also known as Pylaklor White S-15A (CAS Registry No. 6416-68-8),
1,3,6,8-pyrenetetrasulfonic acid, tetrasodium salt (CAS Registry No. 59572-10-0),
pyranine, (CAS Registry No. 6358-69-6, aka 8-hydroxy-1,3,6-pyrenetrisulfonic acid, trisodium salt),
quinoline (CAS Registry No. 91-22-5), 3H-phenoxazin-3-one, 7-hydroxy-, 10-oxide, also known as Rhodalux (CAS Registry No. 550-82-3), xanthylium, 9-(2,4-dicarboxyphenyl)-3,6-bis(diethylamino)-, chloride, disodium salt, also known as Rhodamine WT (CAS Registry No. 37299-86-8), phenazinium, 3,7-diamino-2,8-dimethyl-5-phenyl-, chloride, also known as Safranine O (CAS Registry No. 477-73-6), C.I. Fluorescent Brightener 235, also known as Sandoz CW (CAS Registry No. 56509-06-9), benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Sandoz CD (CAS Registry No. 16470-24-9, aka Flu. Bright. 220), benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, also known as Sandoz TH-40 (CAS Registry No. 32694-95-4), xanthylium, 3,6-bis(diethylamino)-9-(2,4-disulfophenyl)-, inner salt, sodium salt, also known as Sulforhodamine B (CAS Registry No. 3520-42-1, aka Acid Red 52), benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]disodium salt, also known as Tinopal 5BM-GX (CAS Registry No. 169762-28-1), Tinopol DCS (CAS Registry No. 205265-33-4), benzenesulfonic acid, 2,2'-([1,1'-biphenyl]-4,4'-diyldi-2,1-ethenediyl)bis-, disodium salt also known as Tinopal CBS-X (CAS Registry No. 27344-41-8), benzenesulfonic acid, 5-(2H-naphtho[1,2-d]triazol-2-yl)-2-(2-phenylethenyl)-, sodium salt, also known as Tinopal RBS 200, (CAS Registry No. 6416-68-8), 7-benzothiazolesulfonic acid, 2,2'-(1-triazene-1,3-diyldi-4,1-phenylene)bis[6-methyl-, disodium salt, also known as Titan Yellow (CAS Registry No. 1829-00-1, aka Thiazole Yellow G), and all ammonium, potassium and sodium salts thereof, and all like agents and suitable mixtures thereof.

Preferred tracers include:

1-deoxy-1-(3,4-dihydro-7,8-dimethyl-2,4-dioxobenzo[g]pteridin-10(2H)-yl)-D-ribitol, also known as Riboflavin or Vitamin B2 (CAS Registry No. 83-88-5), fluorescein (CAS Registry No. 2321-07-5), fluorescein, sodium salt (CAS Registry No. 518-47-8, aka Acid Yellow 73, Uranine), 2-anthracenesulfonic acid sodium salt (CAS Registry No. 16106-40-4), 1,5-anthracenedisulfonic acid (CAS Registry No. 61736-91-2) and salts thereof, 2,6-anthracenedisulfonic acid (CAS Registry No. 61736-95-6) and salts thereof, 1,8-anthracenedisulfonic acid (CAS Registry No. 61736-92-3) and salts thereof, mono-, di-, or tri-sulfonated napthalenes, including but not limited to 1,5-naphthalenedisulfonic acid, disodium salt (hydrate) (CAS Registry No. 1655-29-4, aka 1,5-NDSA hydrate), 2-amino-1-naphthalenesulfonic acid (CAS Registry No. 81-16-3), 5-amino-2-naphthalenesulfonic acid (CAS Registry No. 119-79-9), 4-amino-3-hydroxy-1-naphthalenesulfonic acid (CAS Registry No. 90-51-7), 6-amino-4-hydroxy-2-naphthalenesulfonic acid (CAS Registry No. 116-63-2), 7-amino-1,3-naphthalenesulfonic acid, potassium salt (CAS Registry No. 79873-35-1), 4-amino-5-hydroxy-2,7-naphthalenedisulfonic acid (CAS Registry No. 90-20-0), 5-dimethylamino-1-naphthalenesulfonic acid (CAS Registry No. 4272-77-9), 1-amino-4-naphthalene sulfonic acid (CAS Registry No. 84-86-6), 1-amino-7-naphthalene sulfonic acid (CAS Registry No. 119-28-8), and 2,6-naphthalenedicarboxylic acid, dipotassium salt (CAS Registry No. 2666-06-0), 3,4,9,10-perylenetetracarboxylic acid (CAS Registry No. 81-32-3), C.I. Fluorescent Brightener 191, also known as, Phorwite CL (CAS Registry No. 12270-53-0), C.I. Fluorescent Brightener 200, also known as Phorwite BKL (CAS Registry No. 61968-72-7), benzenesulfonic acid, 2,2'-(1,2-ethenediyl)bis[5-(4-phenyl-2H-1,2,3-triazol-2-yl)-, dipotassium salt, also known as Phorwite BHC 766 (CAS Registry No. 52237-03-3), benzenesulfonic acid, 5-(2H-naphtho[1,2-d]triazol-2-yl)-2-(2-phenylethenyl)-, sodium salt, also known as Pylaklor White S-15A (CAS Registry No. 6416-68-8), 1,3,6,8-pyrenetetrasulfonic acid, tetrasodium salt (CAS Registry No. 59572-10-0), pyranine, (CAS Registry No. 6358-69-6, aka 8-hydroxy-1,3,6-pyrenetrisulfonic acid, trisodium salt), quinoline (CAS Registry No. 91-22-5), 3H-phenoxazin-3-one, 7-hydroxy-, 10-oxide, also known as Rhodalux (CAS Registry No. 550-82-3), xanthylium, 9-(2,4-dicarboxyphenyl)-3,6-bis(diethylamino)-, chloride, disodium salt, also known as Rhodamine WT (CAS Registry No. 37299-86-8), phenazinium, 3,7-diamino-2,8-dimethyl-5-phenyl-, chloride, also known as Safranine O (CAS Registry No. 477-73-6), C.I. Fluorescent Brightener 235, also known as Sandoz C W (CAS Registry No. 56509-06-9), benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Sandoz CD (CAS Registry No. 16470-24-9, aka Flu. Bright. 220), benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, also known as Sandoz TH-40 (CAS Registry No. 32694-95-4), xanthylium, 3,6-bis(diethylamino)-9-(2,4-disulfophenyl)-, inner salt, sodium salt, also known as Sulforhodamine B (CAS Registry No. 3520-42-1, aka Acid Red 52), benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, also known as Tinopal 5BM-GX (CAS Registry No. 169762-28-1), Tinopol DCS (CAS Registry No. 205265-33-4), benzenesulfonic acid, 2,2'-([1,1'-biphenyl]-4,4'-diyldi-2,1-ethenediyl)bis-, disodium salt, also known as Tinopal CBS-X (CAS Registry No. 27344-41-8), benzenesulfonic acid, 5-(2H-naphtho[1,2-d]triazol-2-yl)-2-(2-phenylethenyl)-, sodium salt, also known as Tinopal RBS 200, (CAS Registry No. 6416-68-8), 7-benzothiazolesulfonic acid, 2,2'-(1-triazene-1,3-diyldi-4,1-phenylene)bis[6-methyl-, disodium salt, also known as Titan Yellow (CAS Registry No. 1829-00-1, aka Thiazole Yellow G), and all ammonium, potassium and sodium salts thereof, and all like agents and suitable mixtures thereof.

The most preferred inert fluorescent tracers of the present invention include 1,3,6,8-pyrenetetrasulfonic acid tetrasodium salt (CAS Registry No. 59572-10-0); 1,5-naphthalenedisulfonic acid disodium salt (hydrate) (CAS Registry No. 1655-29-4, aka 1,5-NDSA hydrate); xanthylium, 9-(2,4-dicarboxyphenyl)-3,6-bis(diethylamino)-, chloride, disodium salt, also known as Rhodamine WT (CAS Registry No. 37299-86-8); 1-deoxy-1-(3,4-dihydro-7,8-dimethyl-2,4-dioxobenzo[g]pteridin-10(2H)-yl)-D-ribitol, also known as Riboflavin or Vitamin B2 (CAS Registry No. 83-88-5); fluorescein (CAS Registry No. 2321-07-5); fluorescein, sodium salt (CAS Registry No. 518-47-8, aka Acid Yellow 73, Uranine); 2-anthracenesulfonic acid sodium salt (CAS Registry No. 16106-40-4); 1,5-anthracenedisulfonic acid (CAS Registry No. 61736-91-2) and salts thereof; 2,6-anthracenedisulfonic acid (CAS Registry No. 61736-95-6) and salts thereof; 1,8-anthracenedisulfonic acid (CAS Registry No. 61736-92-3) and salts thereof; and mixtures thereof. The fluorescent tracers listed above are commercially available from a variety of different chemical supply companies.

In addition to the tracers listed above, those skilled in the art will recognize that salts using alternate counter ions may also be used. Thus, for example, anionic tracers which have $Na^+$ as a counter ion could also be used in forms where the counter ion is chosen from the list of: $K^+$, $Li^+$, $NH_4^+$, $Ca^{+2}$, $Mg^{+2}$ or other appropriate counter ions. In the same way, cationic tracers may have a variety of counter ions, for example: $Cl^-$, $SO_4^{-2}$, $PO_4^{-3}$, $HPO_4^{-2}$; $H_2PO_4^-$; $CO_3^{-2}$; $HCO_3^-$; or other appropriate counter ions.

Modifications of these tracers to control molecular weight or physical size within a desirable size range by, for example, affixing them to an inert polymeric molecule, incorporating them into a fluorescent microsphere or adding additional chemical moieties in the side chains of the molecules should be obvious to those skilled in the art. Such modifications are included herein.

As previously discussed, the inert fluorescent tracer is used in combination with the tagged fluorescent agent to enhance monitoring of membrane separation, particularly with respect to the monitoring and effect of treatment agents added to membrane separation in order to treat scaling and/or fouling.

In this regard, the inert fluorescent tracer and the tagged fluorescent agent can each be measured such that fluctuations in the ratio of the inert fluorescent tracer to the tagged fluorescent agent can be monitored. Such fluctuations can be used to signal consumption of a chemical treatment agent, the onset of scaling and/or fouling, or the like. Adjustments to membrane separation can then be made controllably and responsively to correct for fluctuations with respect to the ratio. Thus, membrane separation performance can be enhanced by, for example, adjusting the amount of treatment agents added to optimize the treatment of scale, foulants and other like deposits which can adversely impact membrane separation.

The fluorescent compounds of the present invention (i.e. the inert fluorescent tracer, the tagged fluorescent agent, or combinations thereof) can be added to the membrane separation process in any suitable form. For example, the present invention utilizes a combination of inert fluorescent tracers and tagged fluorescent agents. In this regard, the inert fluorescent tracers can be utilized to monitor the dosage of treatment agents (e.g., anti-scalants and/or biocides) that are added to the process. The tagged fluorescent agents can be utilized to monitor the active chemical ingredient of such treatment. Thus, the loss of treatment due to, for example, adsorption of a treatment agent on a growing crystal, can be detected based on fluctuations in the ratio of inert fluorescent tracer(s) to tagged fluorescent agents during membrane separating. The diagnostic capabilities of the present invention can be performed with a high degree of sensitivity, selectivity and accuracy with respect to the monitoring of process parameters specific to a membrane separation. In this regard, the method and system of the present invention can be effectively utilized to optimize the performance of membrane separation processes.

The tagged fluorescent agent can include a variety of different and suitable materials. In an embodiment, the tagged fluorescent agent includes a polymeric compound that has one or more fluorescent groups attached or incorporated to its polymeric structure. In an embodiment, the polymeric compound has a molecular weight that ranges from about 2000 atomic mass units ("amu") to about 20,000 amu. The polymeric compound is water-soluble and has one or more monomer components in any suitable amount including, for example, acrylamide, acrylic acid, methacrylamide, vinyl acetate, dimethylaminoethyl acrylate methyl chloride quaternary salt, dimethylaminoethyl acrylate benzyl chloride quaternary salt, diallyldimethyl ammonium chloride, N-vinyl formamide, dimethylaminoethyl methacrylate methyl chloride quaternary salt, dimethylaminoethyl methacrylate benzyl chloride quaternary salt, methacrylamino propyl trimethyl ammonium chloride, acrylamidopropyl trimethyl ammonium chloride, and combinations thereof. Different combinations of these polymeric compounds may be chosen for their ability to target specific scales.

The fluorescent group of the tagged fluorescent agent can include a variety of different and suitable materials including, hydroxy allyloxypropyl napthalimide quat, 4-methoxy-N-(3-N'N'-dimethylaminopropyl) napthalimide, 2-hydroxy-3-allyloxypropyl quat, 8-(3-vinylbenzyloxy)-1,3,6-pyrene trisulfonic acid, 8-(4-vinylbenzyloxy)-1,3,6-pyrene trisulfonic acid, 8-(allyloxy)-1,3,6-pyrene trisulfonic acid, 1-(substituted) naphthalene, 9-(substituted) anthracene, 2-(substituted) quinoline monohydrochloride, 2-(substituted) benzimidazole, 5-(substituted) fluorescein, 4-(substituted) coumarin, coumarin derivatives, 3-(substituted)-6,7-dimethoxy-1-methyl-2(1H)-quinoxazolinone, mixtures thereof and derivatives thereof.

In an embodiment, the tagged fluorescent agent of the present invention includes a hydroxy allyloxy propyl naphthalimide quat, such as 4-methoxy-N-(3-N',N'-dimethylaminopropyl) napthalimide, 2-hydroxy-3-allyloxy propyl quat, tagged onto a 35% aqueous solution of a sulfomethylated copolymer of acrylate and acrylamide wherein the fluorescent group is an amount of about 2% or less by weight of the polymeric compound. A variety of different and suitable tagged fluorescent agents are disclosed in the U.S. Pat. Nos. 5,128,419; 5,171,450; 5,216,086; 5,260,386 and 5,986,030 which are each herein incorporated by reference. In an embodiment, the tagged fluorescent agent or moiety is stable at a pH ranging from about 2 to about 10.

It should be appreciated that a variety of different and suitable modifications, variations and/or derivatives thereof of the above-described tagged fluorescent agents and/or fluorescent groups can be utilized. For example, the hydrogen of the sulfonic acid groups of the substituted pyrene trisulfonic acids discussed above can be replaced with a suitable metal ion including, for example, sodium, potassium, cesium, rubidium, lithium and ammonium. Further, the allyloxy group of the substituted pyrene sulfonic acid can include any suitable number of carbon atoms including, for example, three, four, five, six, eight, eleven and the like.

It should be appreciated that the amount of inert fluorescent tracer and tagged fluorescent agent to be added to the membrane separation process that is effective without being grossly excessive will vary with a respect to a variety of factors including, without limitation, the monitoring method selected, the extent of background interference associated with the selected monitoring method, the magnitude of the expected tracer(s) concentration in the feedwater and/or concentrate, the monitoring mode (such as an on-line continuous monitoring mode), and other similar factors. In an embodiment, the dosage of each of an inert fluorescent tracer(s) and tagged fluorescent agent to the feed water of the membrane separation system includes an amount that is at least sufficient to provide a measurable concentration of the fluorescent agents (i.e., inert fluorescent tracer and tagged fluorescent agent) in the concentrate at steady state of at least about 5 ppt, and preferably at least about 1 part per billion ("ppb") or about 5 ppb or higher, such as, up to about 100 ppm or about 200 ppm, or even as high as about 1000 ppm in the concentrate or other effluent stream. In an embodiment, the amount of fluorescent agents ranges from about 5 ppt to about 1000 ppm, preferably from about 1 ppb to about 50 ppm, and more preferably from about 5 ppb to about 50 ppb.

It should be appreciated that the concentration of tagged fluorescent agent can be modified by varying the number of fluorescent groups on the polymeric compound and/or varying the concentration of the polymeric compound.

The terms "tracing" and "monitoring" as used herein, unless expressly indicated otherwise, mean the determination of the concentration of the fluorescent agents in the membrane separation process. In an embodiment, the tracing/monitoring can be conducted on a singular, intermittent or semi-continuous basis, and preferably the concentration determination is conducted on-site to provide a rapid real-time determination.

In an embodiment, the fluorescent agents of the present invention can be added to a membrane separation system as a component of a formulation, rather than as a separate component, such as a dry solid or neat liquid. The inert fluorescent tracer formulation or product may include an aqueous solution or other substantially homogeneous mixture that disperses with reasonable rapidity in the membrane separation system to which it is added. In this regard, the concentration of the inert fluorescent tracer may be correlated to the concentration of a product. In an embodiment, the product or formulation can include a treatment agent which is added to treat scaling and/or fouling.

As previously discussed, the inert fluorescent tracer(s) and tagged fluorescent agents can be measured or detected to evaluate the performance of the membrane separation process. This can be performed in any suitable manner. A determination of the presence of a fluorescent compound and the concentration thereof in the influent/feedwater and/or other stream of a membrane separation process can be made when the concentration of the compound in the influent/feedwater and/or other stream of a membrane separation system is several ppm or less, even as low as several ppt.

At times, it may be desired to employ a number of different inert fluorescent tracers and tagged fluorescent agents. Such separate and distinct tracers and/or tagged fluorescent agents can each be detected and quantified in a single influent/feedwater and/or other stream fraction provided that their respective wavelengths of emission do not interfere with one another. Thus, concurrent analyses for multiple tracers and/or tagged fluorescent species are possible by selection of fluorescent agents having appropriate spectral characteristics.

The inert fluorescent tracers and tagged fluorescent agents of the present invention can be detected by utilizing a variety of different and suitable techniques. For example, fluorescence emission spectroscopy on a substantially continuous basis, at least over a given time period, is one of the preferred analytical techniques according to an embodiment of the present invention. One method for the continuous on-stream measuring of chemical species by fluorescence emission spectroscopy and other analysis methods is described in U.S. Pat. No. 4,992,380, B. E. Moriarty, J. J. Hickey, W. H. Hoy, J. E. Hoots and D. A. Johnson, issued Feb. 12, 1991, incorporated hereinto by reference.

In general, for most fluorescence emission spectroscopy methods having a reasonable degree of practicality, it is preferable to perform the analysis without isolating in any manner the fluorescent species. Thus, there may be some degree of background fluorescence in the influent/feedwater and/or concentrate on which the fluorescence analysis is conducted. This background fluorescence may come from chemical compounds in the membrane separation system (including the influent/feedwater system thereof) that are unrelated to the membrane separation process of the present invention.

In instances where the background fluorescence is low, the relative measurable intensities (measured against a standard fluorescent compound at a standard concentration and assigned a relative intensity, for instance 100) of the fluorescence of each of the tracer and the tagged fluorophore versus the background can be very high, for instance a ratio of 100/10 or 500/10, when certain combinations of excitation and emission wavelengths are employed even at low fluorescent compound concentrations. Such ratios would be representative of a "relative fluorescence" (under like conditions) of respectively 10 and 50. In an embodiment, the excitation/emission wavelengths and/or the amount of each of the tracer and tagged fluorophore employed are selected to provide a relative fluorescence of at least about 5 or 10 for the given background fluorescence anticipated.

Examples of fluorometers that may be used in the practice of this invention include the TRASAR® 3000 and TRASAR® 8000 fluorometers (available from Ondeo Nalco Company of Naperville, Ill.); the Hitachi F-4500 fluorometer (available from Hitachi through Hitachi Instruments Inc. of San Jose, Calif.); the JOBIN YVON FluoroMax-3 "SPEX" fluorometer (available from JOBIN YVON Inc. of Edison, N.J.); and the Gilford Fluoro-IV spectrophotometer or the SFM 25 (available from Bio-tech Kontron through Research Instruments International of San Diego, Calif.). It should be appreciated that the fluorometer list is not comprehensive and is intended only to show examples of fluorometers. Other commercially available fluorometers and modifications thereof can also be used in this invention.

It should be appreciated that a variety of other suitable analytical techniques may be utilized to measure the amount of inert fluorescent tracers and tagged fluorescent agents during the membrane separation process. Examples of such techniques include combined HPLC-fluorescence analysis, colorimetry analysis, ion selective electrode analysis, transition metal analysis and the like.

For example, the combination of high-pressure liquid chromatography ("HPLC") and fluorescence analyses of inert fluorescent tracers and tagged fluorescent agents can be utilized to detect measurable amounts of the inert fluorescent tracers and tagged fluorescent agents within the membrane separation system of the present invention, particularly when very low levels of the inert fluorescent tracers and tagged fluorescent agents are used or the background fluorescence encountered would otherwise interfere with the efficacy of fluorescence analysis. The HPLC-fluorescence analysis method allows inert fluorescent tracers and tagged fluorescent agents to be separated from the fluid matrix and then the tracer concentration(s) can be measured.

The HPLC method can also be effectively employed to separate a tracer and/or tagged fluorescent agent(s) from a fluid matrix for the purposes of then employing a detection method(s) other than fluorescence analysis. An example of this type of chromatographic technique is described in "Techniques in Liquid Chromatography", C. F. Simpson ed., John Wiley & Sons, New York, pp. 121–122, 1982, incorporated herein by reference, and "Standard Method For The Examination Of Water And Wastewater", 17th Edition, American Public Health Association, pp. 6–9 to 6–10, 1989, incorporated herein by reference.

With respect to colorimetry analysis, colorimetry and/or spectrophotometry may be employed to detect and/or quantify a fluorescent species including an inert fluorescent tracer and/or a tagged fluorescent agent or other fluorescent group. Colorimetry is a determination of a chemical specie from its ability to absorb ultraviolet or visible light. Colorimetric analysis techniques and the equipment that may be employed therefor are described in U.S. Pat. No. 4,992,380, B. E. Moriarty, J. J. Hickey, W. H. Hoy, J. E. Hoots and D. A. Johnson, issued Feb. 12, 1991, incorporated herein by reference.

With respect to ion selective electrode analysis, an ion selective electrode may be used to determine the concentration of an inert fluorescent tracer and/or a tagged fluorescent agent through the direct potentiometric measurement of specific ionic tracers in aqueous systems. An example of an ion selective electrode tracer monitoring technique is described in U.S. Pat. No. 4,992,380, B. E. Moriarty, J. J. Hickey, W. H. Hoy, J. E. Hoots and D. A. Johnson, issued Feb. 12, 1991, incorporated herein by reference.

It should be appreciated that analytical techniques for detecting and/or quantifying the presence and/or concentration of a chemical specie without isolation thereof are within an evolving technology. In this regard, the above survey of analytical techniques suitable for use in detecting measurable amounts of the inert fluorescent tracer(s) and/or tagged fluorescent agent(s) during the membrane separation process of the present invention may presently not be exhaustive. Thus, analytical techniques equivalent to the above for purposes of the present invention may likely be developed in the future.

As previously discussed, the present invention can provide highly selective and/or sensitive monitoring of a variety of process parameters unique and specific to the membrane separation process. The monitoring is based on the measurable amounts of an inert fluorescent tracer in combination with a tagged fluorescent agent analyzed during the membrane separation process. In this regard, the fluorescent species (i.e., inert fluorescent tracer and tagged fluorescent agent) can be detected at any suitable location or locations within the membrane separation process, such as any suitable position in a membrane filtration process along the feedwater stream, the concentrate stream, the permeate stream, the like or combinations thereof. This effectively corresponds to a concentration of the fluorescent species in each stream.

In an embodiment, the monitoring of the membrane filtration process of the present invention can be based on a measurable amount of each of the tracer (i.e., the inert fluorescent tracer and tagged fluorescent agent) from at least one of the feedwater stream, the permeate stream and the concentrate stream.

In this regard, monitoring of an amount of the inert fluorescent tracer and tagged fluorescent agent as it may vary during membrane filtration can be utilized to evaluate a number of process parameters specific to membrane filtration such as the ratio of the inert fluorescent tracer to the tagged fluorescent agent or the like, with a high degree of sensitivity, selectivity and accuracy, as previously discussed. The ability to evaluate these types of membrane separation process parameters with such level of certainty, sensitivity and selectivity and on a continual basis in accordance with the present invention can provide a better understanding, in real time, of the performance of the membrane. Thus, adjustments to the membrane separation process can be made more responsively and effectively based on the measured amount of the inert fluorescent tracer and/or the tagged fluorescent agent, if needed, to optimize membrane performance. For example, adjustments can be made to increase the recovery ratio or percent recovery of the membrane separation system. In this regard, increasing the recovery ratio or percent recovery, for unit product, will reduce the feedwater required and thus reduce feedwater costs, lower influent fluid pretreatment costs and chemical treatment requirements. It should be appreciated that the optimal percent rejection value can vary with respect to the type of membrane separation system.

However, unless controlled or optimally minimized, the scale and/or fouling of the membrane can adversely impact the performance of membrane separation. If deposition on the membrane is neither prevented nor detected soon enough for effective removal by cleaning methods, the normal life of the membrane, which can be about three to five years for reverse osmosis, may be severely shortened and replacement costs dramatically increased. As previously discussed, the membrane separation systems are more sensitive to such scaling and/or fouling activity as compared to cooling water systems. It should be appreciated that the membrane separation system of the present invention can include any suitable type and amount of components in order to effectively treat the scale and/or fouling conditions, such as, any suitable treatment or pretreatment system including antiscalants and/or biofouling agents, filters, treatment equipment, such as chemical agent delivery devices, like suitable components or combinations thereof.

For example, suitable antiscalants that can be used in the membrane separation system (especially reverse osmosis systems) of the present invention include suitable polymers in aqueous solution which can inhibit the formation and growth of alkaline earth carbonate and sulfate scales, including calcium carbonate ("$CaCO_3$"), calcium sulfate ("$CaSO_4$") or the like. Antiscalant chemicals are generally fed continuously into the feed stream wherein the optimum feed point is before a cartridge prefilter positioned along the feedwater stream. The use of a continuous feed of antiscalants can minimize or eliminate the need for acid to be fed into the system in order to control scale, and can facilitate the suspension of solids and colloids in solution. This can minimize membrane fouling, and inhibit the precipitation of $CaCO_3$ and $CaSO_4$.

In an embodiment, the present invention can monitor and/or control the concentration of the scaling and/or biofouling treatment agents within the membrane separation process based on the measurable amounts of tracer in the system. In an embodiment, the inert fluorescent tracer is continuously fed to the feedwater along with the tagged fluorescent treatment agents. It should be appreciated that the inert fluorescent tracer can be added separately or as a part of a formulation of the treatment agent to the feedwater. In an embodiment, the inert fluorescent tracer is fed to the feedwater in known proportion to the scaling and/or bio-fouling agent. In this regard, the measure of the inert fluorescent tracer concentration corresponds to (is proportional to) the chemical concentration (under zero-system-consumption conditions) at any suitable tracer monitoring point within the membrane separation system.

As previously discussed, the tagged fluorescent agents are utilized in combination with the inert fluorescent tracers. In this regard, one or more types of fluorescent tags can be added to a polymeric compound suitable for use as a water treatment agent in order to effectively monitor the effects of the treatment agents on the membrane separation.

Applicants have discovered that the use of a tagged fluorescent agent in combination with an inert fluorescent tracer provides an added level of monitoring as compared to the sole use of an inert fluorescent tracer. In this regard, the inert fluorescent tracer component can be monitored to evaluate the dosage of treatment agent added to the membrane separation system, and the tagged fluorescent agents can be monitored to evaluate an active chemical ingredient (e.g., one that is reactive within the system, such as adsorbing to a growing crystal). Thus, a decrease in the effects of the treatment agent(s) due to, for example, a loss of the treatment agent due to adsorption on a growing crystal, can be monitored and detected by evaluating a change in a ratio of inert to tagged fluorophores.

The chemicals or treatment agents employed as antiscalants and/or anti-fouling agents, and the mechanisms by which they inhibit scale deposition, may change as improvements are made in antiscalant chemistry for membrane filtration systems, but the need for a continuous feed of treatment agents will most likely continue despite the improvements. The preferred inert and tagged fluorophores of the present invention, will substantially have a rejection factor of 1, and more preferably will be employed in minute concentrations. Thus, the use of the tracer of the present invention will not in any significant manner add to the total dissolved solids ("TDS") of the permeate nor detrimentally affect a downstream ion exchange process or other permeate polishing process.

The rejection factor is defined as follows:

Rejection Factor=$(C_F-C_P)/C_F$ where $C_F$ is the concentration of the fluorophore in the feed stream and $C_P$ is the concentration of the fluorophore in the permeate stream.

The tracers (i.e., inert and tagged fluorophores) of the present invention can be utilized to monitor a variety of different parameters specific to membrane separation such that the performance of membrane separation processes can be effectively monitored and controlled. In an embodiment, the parameters can include, for example, operational parameters, chemical parameters, mechanical parameters, and combinations thereof. In this regard, the present invention can be utilized to assess and/or control a variety of different process conditions that can impact membrane performance, for example, scaling and/or fouling conditions, membrane leakage, degradation and the like specific to the membrane separation process.

The methods of the present invention can include any suitable type, number and combination of components, such as tracer compounds, tracer detection devices (e.g., analytical techniques) or the like. In an embodiment, the chemical compound(s) selected as the tracer(s) is soluble in the membrane separation stream to which it is added to the concentration value desired and is substantially stable in the environment thereof for the useful life expected of the tracer(s) (e.g., tagged and/or inert). In a preferred embodiment, the combination of the chemical compound(s) selected as the tracer(s) and the analytical technique selected for determining the presence of such tracer(s) permits such determination without isolation of the tracer(s), and more preferably should permit such determination on a continuous and/or on-line basis.

In an embodiment, the present invention includes a controller (not shown) to monitor and/or control the operating conditions and the performance of the membrane separation process based on the measurable amount of tracer(s) (e.g., inert fluorescent tracer and tagged fluorescent agent). The controller can be configured and/or adjusted in a variety of different and suitable ways.

For example, the controller can be in contact with a detection device (not shown) to process the detection signal (e.g., filter noise from the signal) in order to enhance the detection of the tracer concentration. Further, the controller can be adjusted to communicate with other components of the membrane separation system. The communication can be either hard wired (e.g., electrical communication cable), a wireless communication (e.g., wireless RF interface), a pneumatic interface or the like.

In this regard, the controller can be utilized to control the performance of membrane separation. For example, the controller can communicate with a feed device (not shown) in order to control the dosage of treatment agents, such as antiscalants and biocides, within the membrane separation process based on the monitoring of the measurable amounts of inert fluorescent tracers, tagged fluorescent agents and ratios thereof.

It should be appreciated that pairs or groups of tracer monitoring points that are to be compared should not be positioned across a flow-through site that has a high concentration of solids, for instance a solids concentration of at least about 5 or about 10 weight percent per unit volume based on a measured volume unit of about one cubic inch. Such high solids concentration flow-through sites are found at the site of filter cakes and the like. In this regard, these sites may absorb, or selectively absorb, at least some amount of the tracer. This can distort the significance of monitoring comparison. When a tracer is added upstream of, for instance, a cartridge filter, in an embodiment, the first monitoring location of a monitoring pair should preferably be downstream of such sites.

However, separate monitorings across a flow-through site of high solids concentration may be conducted to determine the loss of tracer from the fluid, and if such loss is nonselective for the tracer, the loss of other solutes at that site. For instance, when the flow-through site is a cartridge filter, such monitorings can determine the loss of solutes, if any, attributable to that pretreatment location. Other high solids concentration sites include without limitation sites of solids concentration(s) created by the use of chemical additives, such as coagulants, flocculants and the like.

In an embodiment, the inert fluorescent tracer selected is not a visible dye, that is, the inert fluorescent tracer is a chemical specie that does not have a strong absorption of electromagnetic radiation in the visible region, which extends from about 4000 Angstroms to about 7000 Angstroms (from about 400 nanometers ("nm") to about 700 nm). Preferably the tracer is chosen from a class of materials which are excited by absorption of light and product fluorescent light emission, where the excitation and emission light occurs at any point within the far ultraviolet to near infrared spectral regions (wavelengths from 200–800 nm). The relative fluorescence intensity of the inert fluorescent tracer must be such that it is detectable in the amounts specified by product formulations (typically 2–10 ppb as active fluorophore when dosed into the feed water stream of a device).

Alternatively, when the tracer dye does have strong adsorbtions in the visible spectrum, it is used in concentrations such that it is not detectable to the naked eye. Such embodiments may be preferred, for instance, when a membrane's percent rejection of the tracer is less than 100 percent, and it is desirable to produce a permeate free of color.

In some instances it may be preferable to chose a fluorophore which emits visible fluorescent light when excited by UV light. This may be preferred when visual detection and/or photographic or other imaging of the system is desired.

Although membrane separation systems are often employed for the purification of water, or the processing of aqueous streams, the systems of the present invention are not limited to the use of an aqueous influent. In an embodiment, the influent may be another fluid, or a combination of water and another fluid. The operational principles of membrane separation systems and processes of the present invention are not so governed by the nature of the influent that the present invention could not be employed with influents otherwise suitable for water purification in a given membrane separation system. The descriptions of the invention above that refer to aqueous systems are applicable also to nonaqueous and mixed aqueous/nonaqueous systems.

In an embodiment, the fluorescent tracer (e.g., inert and/or tagged) monitoring methods of the present invention can be utilized to monitor membranes which are subjected to destructive (sacrificial) testing. This type of testing may include the sectioning or division of an industrial membrane, for instance by cutting, into a number of separate membranes pieces prior to testing so that a number of tests can be performed, each on a different section of the membrane. The fluorescent tracer monitoring of the present invention can be utilized to monitor a number of different parameters of destructive testing including without limitation the effects of excessive pressure, contact with a membrane-destructive fluid and the like. The diagnostic regime of the destructive testing would generally be focused on the membrane which may be subjected to visual inspection of its surface, a membrane-surface microbiological analysis by swabbing of its surface and analysis of water samples in contact with membrane, surface analysis for inorganic deposits by scanning electron microscopy/electrodispersive spectroscopy ("SEM/EDS"), surface analysis for organic deposits by infrared ("IR") spectroscopy, electron microscopy, ionically coupled plasma ("ICP") analysis and like surface analysis techniques.

Although the membrane during destructive testing is not on-line, in an embodiment of the present invention, the tracer can be added to a fluid stream which flows to the membrane and passes by or through it as a first effluent stream to exit as a second effluent stream. The tracer can be added to the fluid upstream of the membrane and the tracer in the fluid stream at least passes by the membrane as a component of the first effluent stream and/or passes through the membrane to exit as a component of the second effluent stream. The tracer is monitored in the fluid stream at a point before the membrane to determine an influent tracer concentration value, and/or in at least one of the first and the second effluent streams to determine an effluent tracer concentration. In this regard, the tracer is representative of a solute of the fluid stream that can be added to the fluid in an amount sufficient for the determinations of influent tracer concentration and effluent tracer concentration. Thus, the separation performance of the membrane can be determined prior to actual use.

"Deposits" is meant herein to refer to material that forms and/or collects on surfaces of a membrane. The "amount" or "concentration" of inert fluorescent tracers and/or tagged fluorescent agents, is meant herein to refer to the concentration of a fluorescent species in the specified fluid in terms of weight of the species per unit volume of the fluid, or weight of the species per unit weight of the fluid, or some characteristic of the species that is proportional to its concentration in the fluid and can be correlated to a numerical value of the species concentration in the fluid (whether or not that correlation conversion is calculated), and can be a value of zero or substantially zero. Thus, the present process includes the detection of the absence of such chemical species, at least to the limitations of the analytical method employed.

The foregoing descriptions of the present invention at times refer specifically to aqueous influents and effluents, and the use of an aqueous system for describing a membrane filtration system and the operation of the present invention therein is exemplitive. A person of ordinary skill in the art, given the disclosures of the present specification, would be aware of how to apply the foregoing descriptions to non-aqueous membrane filtration systems.

"Treatment chemicals and/or agents" is meant herein without limitation to include treatment chemicals that enhance membrane separation process performance, antiscalants that retard/prevent membrane scale deposition, antifoulants that retard/prevent membrane fouling, biodispersants, microbial-growth inhibiting agents, such as biocides, and cleaning chemicals that remove membrane deposits, like materials and combinations thereof.

It should be appreciated that the present invention is applicable to all industries that can employ membrane separation processes. For example, the different types of industrial processes in which the method of the present invention can be applied generally include raw water processes, waste water processes, industrial water processes, municipal water treatment, food and beverage processes, pharmaceutical processes, electronic manufacturing, utility operations, pulp and paper processes, mining and mineral processes, transportation-related processes, textile processes, plating and metal working processes, laundry and cleaning processes, leather and tanning processes, and paint processes.

In particular, food and beverage processes can include, for example, dairy processes relating to the production of cream, low-fat milk, cheese, specialty milk products, protein isolates, lactose manufacture, whey, casein, fat separation, and brine recovery from salting cheese. Uses relating to the beverage industry including, for example, fruit juice clarification, concentration or deacidification, alcoholic beverage clarification, alcohol removal for low-alcohol content beverages, process water; and uses relating to sugar refining, vegetable protein processing, vegetable oil production/processing, wet milling of grain, animal processing (e.g., red meat, eggs, gelatin, fish and poultry), reclamation of wash waters, food processing waste and the like.

Examples of industrial water uses as applied to the present invention include, for example, boiler water production, process water purification and recycle/reuse, softening of raw water, treatment of cooling water blow-down, reclamation of water from papermaking processes, desalination of sea and brackish water for industrial and municipal use, drinking/raw/surface water purification including, for example, the use of membranes to exclude harmful microorganisms from drinking water, polishing of softened water, membrane bio-reactors, mining and mineral process waters.

Examples of waste water treatment applications with respect to the tracer monitoring of the methods of the present invention include, for example, industrial waste water treatment, biological waste treatment systems, removal of heavy metal contaminants, polishing of tertiary effluent water, oily waste waters, transportation related processes (e.g., tank car wash water), textile waste (e.g., dye, adhesives, size, oils for wool scouring, fabric finishing oils), plating and metal working waste, laundries, printing, leather and tanning, pulp and paper (e.g., color removal, concentration of dilute spent sulfite liquor, lignon recovery, recovery of paper coatings), chemicals (e.g., emulsions, latex, pigments, paints, chemical reaction by-products), and municipal waste water treatment (e.g., sewage, industrial waste).

Other examples of industrial applications of the present invention include, for example, semiconductor rinse water processes, production of water for injection, pharmaceutical water including water used in enzyme production/recovery and product formulation, and electro-coat paint processing.

Examples of diagnostics which can be determined by the use of inert fluorescent tracers include, but are not limited to, effective "residence times" for species within the membrane, system flow profiles, membrane damage detection, system recovery based on mass balance, detection of scaling or fouling tendency (based on differences between mass balance and flow based system parameters), system volume calculation, chemical treatment product distribution and feed variability.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method for monitoring a membrane separation process including a membrane capable of separating a feed stream into a first stream and a second stream to remove solutes from the feed stream comprising the steps of:
   providing an inert fluorescent tracer and a tagged fluorescent agent;
   introducing the inert fluorescent tracer and tagged fluorescent agent;
   providing a fluorometer to detect the fluorescent signal of the inert fluorescent tracer and the tagged fluorescent agent in at least one of the first stream and the second stream; and
   using the fluorometer to determine an amount of the inert fluorescent tracer and the tagged fluorescent agent in at least one of the feed stream, the first stream and the second stream.

2. The method of claim 1 further comprising the step of evaluating at least one process parameter specific to the membrane separation process based on the amount of the inert fluorescent tracer and the tagged fluorescent agent that are measured.

3. The method of claim 1 wherein the membrane separation process is selected from the group consisting of a cross-flow membrane separation process and a dead-end flow membrane separation process.

4. The method of claim 3 wherein the membrane separation process is selected from the group consisting of reverse osmosis, ultrafiltration, microfiltration, nanofiltration, electrodialysis, electrodeionization, pervaporation, membrane extraction, membrane distillation, membrane stripping and combinations thereof.

5. The method of claim 3 wherein the membrane separation process is selected from the group consisting of reverse osmosis, ultrafiltration, microfiltration and nanofiltration.

6. The method of claim 1 wherein the inert fluorescent tracer is selected from the group consisting of 3,6-acridinediamine, N,N,N',N'-tetramethyl-, monohydrochloride; 2-anthracenesulfonic acid sodium salt; 1,5-anthracenedisulfonic acid; 2,6-anthracenedisulfonic acid; 1,8-anthracenedisulfonic acid; anthra[9,1,2-cde]benzo[rst]pentaphene-5,10-diol, 16,17-dimethoxy-,bis(hydrogen sulfate), disodium salt; bathophenanthrolinedisulfonic acid disodium salt; amino 2,5-benzene disulfonic acid; 2-(4-aminophenyl)-6-methylbenzothiazole; 1H-benz[de]isoquinoline-5-sulfonic acid, 6-amino-2,3-dihydro-2-(4-methylphenyl)-1,3-dioxo-, monosodium salt; phenoxazin-5-ium, 1-(aminocarbonyl)-7-(diethylamino)-3,4-dihydroxy-, chloride; benzo[a]phenoxazin-7-ium, 5,9-diamino-,acetate; 4-dibenzofuransulfonic acid; 3-dibenzofuransulfonic acid; 1-ethylquinaldinium iodide; fluorescein; fluorescein, sodium salt; Keyfluor White ST; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-,tetrasodium salt; C.I. Florescent Brightener 230; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]-, tetasodium salt; 9,9'-biacridinium, 10,10'-dimethyl-, dinitrate; 1-deoxy-1-(3,4-dihydro-7,8-dimethyl-2,4-dioxobenzo[g]pteridin-10(2H)-yl)-ribitol; mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenesulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; C.I. Fluorescent Brightener 191; C.I. Fluorescent Brightener 200; benzenesulfonic acid, 2,2'-(1,2-ethenediyl)bis[5-(4-phenyl-2H-1,2,3-triazol-2-yl)-, dipotassium salt; benzenesulfonic acid, 5-(2H-naphtho[1,2-d]triazol-2-yl)-2(2-phenylethenyl)-, sodium salt; 1,3,6,8-pyrenetetrasulfonic acid, tetrasodium salt; pyranine; quinoline; 3H-phenoxazin-3-one, 7-hydroxy-, 10-oxide; xanthylium, 9-(2,4-dicarboxyphenyl)-3,6-bis(diethylamino)-, chloride, disodium salt; phenazinium, 3,7-diamino-2,8-dimethyl-5-phenyl-, chloride; C.I. Fluorescent Brightener 235; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt; benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt; xanthylium, 3,6-bis(diethylamino)-9-(2,4-disulfophenyl)-, inner salt, sodium salt;

benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt; Tinopol DCS; benzenesulfonic acid, 2,2'-([1,1'-biphenyl]-4,4'-diyldi-2,1-ethenediyl)bis, disodium salt; benzenesulfonic acid, 5-(2H-naphtho[1,2-d]triazol-2-yl)-2-(2-phenylethenyl)-, sodium salt; 7-benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof.

7. The method of claim 1 wherein the inert fluorescent tracer is selected from the group consisting of 1-deoxy-1-(3,4-dihydro-7,8-dimethyl-2,4-dioxobenzo[g]pteridin-10(2H)-yl)-D ribitol; fluorescein; fluorescein, sodium salt; 2-anthracenesulfonic acid sodium salt; 1,5-anthracenedisulfonic acid; 2,6-anthracenedisulfonic acid; 1,8-anthracenedisulfonic acid; mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenesulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; C.I. Fluorescent Brightener 191; C.I. Fluorescent Brightener 200; benzenesulfonic acid, 2,2'-(1,2-ethenediyl)bis[5-(4-phenyl-2H-1,2,3-triazol-2-yl) dipotassium salt; benzenesulfonic acid, 5-(2H-naphtho[1,2-d]triazol-2-yl)-2-(2-phenylethenyl)-, sodium salt; 1,3,6,8-pyrenetetrasulfonic acid, tetrasodium salt; pyranine; quinoline; 3H-phenoxazin-3-one, 7-hydroxy-, 10-oxide; xanthylium, 9-(2,4-dicarboxyphenyl)-3,6-bis (diethylamino)-, chloride, disodium salt; phenazinium, 3,7-diamino-2,8-dimethyl-5-phenyl-, chloride; C.I. Fluorescent Brightener 235; benzenesulfonic acid, 2,2'-(1,2-ethenediyl) bis[5-[[4-[bis(2-hydroxyethyl)amino]-6-[(4-sulfophenyl) amino]-1,3,5-triazin-2-yl]amino-], tetrasodium salt; benzenesulfonic acid, 2,2'-(1,2-ethenediyl)bis[5-[[4-[4-[2-hydroxypropyl)amino]-6-(phenylamino)-1,3,5-triazin-2-yl] amino]-, disodium salt; xanthylium, 3,6-bis(diethylamino)-9-(2-4-disulfophenyl)-, inner salt, sodium salt; benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, salt; Tinopol DCS; benzenesulfonic acid, 2,2'-([1,1'-biphenyl]-4,4'-diyldi-2,1-ethenediyl)bis-,disodium salt; benzenesulfonic acid, 5-(2H-naphtho[1,2-d]triazol-2-yl)-2-(2-phenylethenyl)-, sodium salt; 7-benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof.

8. The method of claim 1 wherein the inert fluorescent tracer is selected from the group consisting of 1,3,6,8-pyrenetetrasulfonic acid tetrasodium salt; 1,5-naphthalenedisulfonic acid disodium salt (hydrate); xanthylium, 9-(2,4-dicarboxyphenyl)-3,6-bis (diethylamino)-, chloride, disodium salt; 1-deoxy-1-(3,4-dihydro-7,8-dimethyl-2,4-dioxobenzo[g]pteridin-10(2H)-yl)-D-ribitol; fluorescein; flurorescein, sodium salt; 2-anthracenesulfonic acid sodium salt; 1,5-anthracenedisulfonic acid; 2,6-anthracenedisulfonic acid; 1,8-anthracenedisulfonic acid; and mixtures thereof.

9. The method of claim 1 wherein the tagged fluorescent agent comprises a water-soluble polymer tagged with at least one fluorescent group.

10. The method of claim 9 wherein the fluorescent group is selected from the group consisting of hydroxy allyloxypropyl napthalimide quat, 4-methoxy-N-(3-N'N'-dimethylaminopropyl) napthalimide, 2 hydroxy-3-allyloxypropyl quat, 8-(3-vinylbenzyloxy)-1,3,6-pyrene trisulfonic acid; 8-(4-vinylbenzyloxy)-1,3,6-pyrene trisulfonic acid, 8-(allyloxy)-1,3,6-pyrene trisulfonic acid, 1-(substituted) naphthalene, 9-(substituted) anthracene, 2-(substituted) quinoline monohydrochloride, 2-(substituted) benzimidazole, 5-(substituted) fluorescein, 4-(substituted) coumarin, coumarin derivatives, 3-(substituted)-6,7-dimethoxy-1-methyl-2(1H)-quinoxazolinone, mixtures thereof and derivatives thereof.

11. The method of claim 9 wherein the water-soluble polymer comprises a monomer selected from the group consisting of acrylamide, acrylic acid, methacrylamide, vinyl acetate, dimethylaminoethyl acrylate methyl chloride quaternary salt, dimethylaminoethyl acrylate benzyl chloride quaternary salt, diallyldimethyl ammonium chloride, N-vinyl formamide; dimethylaminoethyl methacrylate methyl chloride quaternary salt, dimethylaminoethyl methacrylate benzyl chloride quaternary salt, methacrylamino propyl trimethyl ammonium chloride, acrylamidopropyl trimethyl ammonium chloride, and combinations thereof.

12. The method of claim 1 wherein the tagged fluorescent agent comprises a copolymer of acrylate and acrylamide tagged with a hydroxy allyloxypropyl napthalimide quat in an amount of about 2% or less by weight of the copolymer.

13. The method of claim 1 wherein the inert fluorescent tracer and the tagged fluorescent agent are each introduced into the feed stream in an amount from about 5 ppt to about 1000 ppm.

14. The method of claim 1 wherein the inert fluorescent tracer and the tagged fluorescent agent are each introduced into the feed stream in an amount from about 1 ppb to about 50 ppm.

15. The method of claim 1 wherein the inert fluorescent tracer and the tagged fluorescent agent are each introduced into the feed stream in an amount from about 5 ppb to about 50 ppb.

16. The method of claim 1 wherein the inert fluorescent tracer and tagged fluorescent agent are added to a formulation capable of treating scaling and/or fouling prior to addition to the feed stream.

17. A method for monitoring a membrane separation system of a water purification process including a membrane capable of removing solutes from a feed stream suitable for use in an industrial process comprising the steps of:

adding an inert fluorescent tracer and a tagged fluorescent agent to the feed stream;

contacting the membrane with the feed stream;

separating the feed stream into a permeate stream and a concentrate stream to remove solutes from the feed stream;

providing a fluorometer to detect the fluorescent signal of the inert fluorescent tracer and the tagged fluorescent agent in at least one of the permeate stream and the concentrate stream;

using the fluorometer to measure an amount of the inert fluorescent tracer and the tagged fluorescent agent in at least one of the permeate stream and the concentrate stream; and determining a ratio of the inert fluorescent tracer to the tagged fluorescent agent based on the measurable amounts of the inert fluorescent tracer and the tagged fluorescent agent.

18. The method of claim 17 further comprising the step of evaluating the removal of solutes from the feed stream based on the ratio.

19. The method of claim 17 wherein the industrial process is selected from the group consisting of raw water processes, waste water processes, industrial water processes, municipal water treatment, food and beverage processes, pharmaceutical processes, electronic manufacturing, utility operations, pulp and paper processes, mining and mineral processes, transportation-related processes, textile processes, plating and metal working processes, laundry and cleaning processing, leather and tanning processes, and paint processes.

20. The method of claim 17 wherein the feed stream contacts the membrane in at least one of a cross-flow and a perpendicular flow relative to the membrane to remove solutes from the feed stream.

21. The method of claim 17 wherein the inert fluorescent tracer is selected from the group consisting of 3,6-acridinediamine, N,N,N',N'-tetramethyl-, monohydrochloride; 2-anthracenesulfonic acid sodium salt; 1,5-anthracenedisulfonic acid; 2,6-anthracenedisulfonic acid; 1,8-anthracenedisulfonic acid; anthra[9,1,2-cde]benzo[rst]pentaphene-5,10-diol, 16,17-dimethoxy-,bis(hydrogen sulfate), disodium salt; bathophenanthrolinedisulfonic acid disodium salt; amino 2,5-benzene disulfonic acid; 2-(4-aminophenyl)-6-methylbenzothiazole; 1H-benz[de]isoquinoline-5-sulfonic acid, 6-amino-2,3-dihydro-2-(4-methylphenyl)-1,3-dioxo-, monosodium salt; phenoxazin-5-ium, 1-(amino carbonyl)-7-(diethylamino)-3,4-dihydroxy-, chloride; benzo[a]phenoxazin-7-ium, 5,9-diamino-,acetate; 4-dibenzofuransulfonic acid; 3-dibenzofuransulfonic acid; 1-ethylquinaldinium iodide; fluorescein; fluorescein, sodium salt; Keyfluor White ST; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-,tetrasodium salt; C.I. Florescent Brightener 230; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetasodium salt; 9,9'-biacridinium, 10,10'-dimethyl-, dinitrate; 1-deoxy-1-(3,4-dihydro-7,8-dimethyl-2,4-dioxobenzo[g]pteridin-10(2H)-yl)-ribitol; mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenesulfonic acid, potassium salt; 4-amino-4-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; C.I. Fluorescent Brightener 191; C.I. Fluorescent Brightener 200; benzenesulfonic acid, 2,2'-(1,2-ethenediyl)bis[5-(4-phenyl-2H-1,2,3-triazol-2-yl)-, dipotassium salt; benzenesulfonic acid, 5-(2H-naphtho[1,2-d]triazol-2-yl)-2-(2-phenylethenyl)-, sodium salt; 1,3,6,8-pyrenetetrasulfonic acid, tetrasodium salt; pyranine; quinoline; 3H-phenoxazin-3-one, 7-hydroxy-, 10-oxide; xanthylium, 9-(2,4-dicarboxyphenyl)-3,6-bis(diethylamino)-, chloride, disodium salt; phenazinium, 3,7-diamino-2,8-dimethyl-5-phenyl-, chloride; C.I. Fluorescent Brightener 235; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt; benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt; xanthylium, 3,6-bis(diethylamino)-9-(2,4-disulfophenyl)-, inner salt, sodium salt; benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt; Tinopol DCS; benzenesulfonic acid, 2,2'-([1,1'-biphenyl]-4,4'-diyldi-2,1-ethenediyl)bis-, disodium salt; benzenesulfonic acid, 5-(2H-naphtho[1,2-d]triazol-2-yl)-2-(2-phenylethenyl)-, sodium salt; 7-benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof.

22. The method of claim 17 wherein the tagged fluorescent agent comprises a polymeric water-soluble compound tagged with at least one fluorescent group selected from the group consisting of hydroxy allyloxypropyl napthalimide quat, 4-methoxy-N-(3-N'N'-dimethylaminopropyl) napthalimide, 2 hydroxy-3-allyloxypropyl quat, 8-(3-vinylbenzyloxy)-1,3,6-pyrene trisulfonic acid; 8-(4-vinylbenzyloxy)-1,3,6-pyrene trisulfonic acid, 8-(allyloxy)-1,3,6-pyrene trisulfonic acid, 1-(substituted) naphthalene, 9-(substituted) anthracene, 2-(substituted) quinoline monohydrochloride, 2-(substituted) benzimidazole, 5-(substituted) fluorescein, 4-(substituted) coumarin, coumarin derivatives, 3-(substituted)-6,7-dimethoxy-1-methyl-2(1H)-quinoxazolinone, mixtures thereof and derivatives thereof.

23. A membrane separation system capable of purifying a feed stream suitable for use in an industrial process comprising:

a semi-permeable membrane capable of separating the feed stream containing an inert fluorescent tracer and a tagged fluorescent agent into a permeate stream and a concentrate stream to remove one or more solutes from the feed stream; means for adding said inert fluorescent tracer and said tagged fluorescent agent to the feed stream;

a detection device capable of and arranged for fluorometrically measuring an amount of the inert fluorescent tracer and the tagged fluorescent agent each ranging from about 5 ppt to about 1000 ppm in at least one of the permeate stream and the concentrate stream wherein the detection device is capable of producing a signal indicative of the amount of inert fluorescent tracer and tagged fluorescent agent that is measured; and a controller capable of processing the signal to monitor and/or control the purification of the feed stream.

24. The system of claim 23 wherein the membrane separation system is capable of evaluating at least one process parameter specific to membrane separation selected from the group consisting of operational parameters, chemical parameters, a ratio of the inert fluorescent tracer to the tagged fluorescent agent, mechanical parameters and combinations thereof.

25. The system of claim 23 wherein the controller is capable of controllably adjusting an amount of treatment agents added to the feed stream in order to treat scaling and/or fouling during membrane separation.

26. A method for monitoring and controlling a membrane separation process including a membrane capable of removing solutes from a feed stream for use in an industrial process comprising the steps of:

adding an inert fluorescent tracer and a tagged fluorescent agent to the feed stream;

contacting the membrane with the feed stream;

separating the feed stream into a first effluent stream and a second effluent stream to remove solutes from the feed stream;

providing a fluorometer to detect the fluorescent signal of the inert fluorescent tracer and the tagged fluorescent agent in at least one of the first effluent stream and the second effluent stream;

using the fluorometer to measure the inert fluorescent tracer and the tagged fluorescent agent in an amount ranging from about 5 ppt to about 1000 ppm in at least one of the first effluent stream and the second effluent stream; and evaluating at least one process parameter specific to membrane separation based on the measurable amounts of the inert fluorescent tracer and the tagged fluorescent agent.

27. The method of claim 26 wherein the process parameters are selected from the group consisting of operational parameters, chemical parameters, a ratio of the inert fluorescent tracer to the tagged fluorescent agent, mechanical parameters and combinations thereof.

28. The method of claim 27 comprising controllably and responsively adjusting at least one process parameter to enhance performance during membrane separation.

29. The method of claim 26 comprising monitoring and controlling a treatment agent added to the membrane separation process in order to treat scaling and/or fouling.

* * * * *